(12) United States Patent
Tsai

(10) Patent No.: US 6,957,498 B2
(45) Date of Patent: Oct. 25, 2005

(54) BRAKE DRUM CALIPER

(76) Inventor: Eva J. Tsai, 46924 Zapotec Dr., Fremont, CA (US) 94539

(*) Notice: Subject to any disclaimer, the term of this patent is extended or adjusted under 35 U.S.C. 154(b) by 0 days.

(21) Appl. No.: 10/717,592

(22) Filed: Nov. 21, 2003

(65) Prior Publication Data

US 2005/0108887 A1 May 26, 2005

(51) Int. Cl.⁷ ............................................... G01B 5/14
(52) U.S. Cl. ............................ 33/610; 33/810; 33/783
(58) Field of Search ........................ 33/783–784, 792, 33/794, 796, 810–811, 813, 827, 832, 600, 33/609–610, 542, 203

(56) References Cited

U.S. PATENT DOCUMENTS

| | | | |
|---|---|---|---|
| 1,145,852 A | 7/1915 | Schram | |
| 1,510,285 A | 9/1924 | Lustenberger | |
| 2,325,558 A * | 7/1943 | Uslan | 33/832 |
| 3,315,369 A * | 4/1967 | Johnson | 33/810 |
| 3,507,048 A * | 4/1970 | Owens | 33/610 |
| 3,562,773 A | 2/1971 | Wilamowski | |
| 3,827,153 A | 8/1974 | Mitchel | |
| 4,353,168 A * | 10/1982 | Ginggen | 33/795 |
| 4,520,568 A * | 6/1985 | Drenner | 33/610 |
| 4,743,902 A | 5/1988 | Andermo | |
| 5,317,814 A | 6/1994 | Rogler | |
| 5,465,501 A | 11/1995 | Rogler | |
| 6,216,357 B1 * | 4/2001 | Victor et al. | 33/810 |

* cited by examiner

Primary Examiner—G. Bradley Bennett
Assistant Examiner—Tania C. Courson
(74) Attorney, Agent, or Firm—John P. Sutton

(57) ABSTRACT

A brake drum caliper is disclosed having a beam and two jaws for measuring the inside diameter of a cylinder, with the improvement of limit stops on each jaw for accurately measuring diameter of the cylinder in at least two depths from the top of the cylinder.

5 Claims, 2 Drawing Sheets

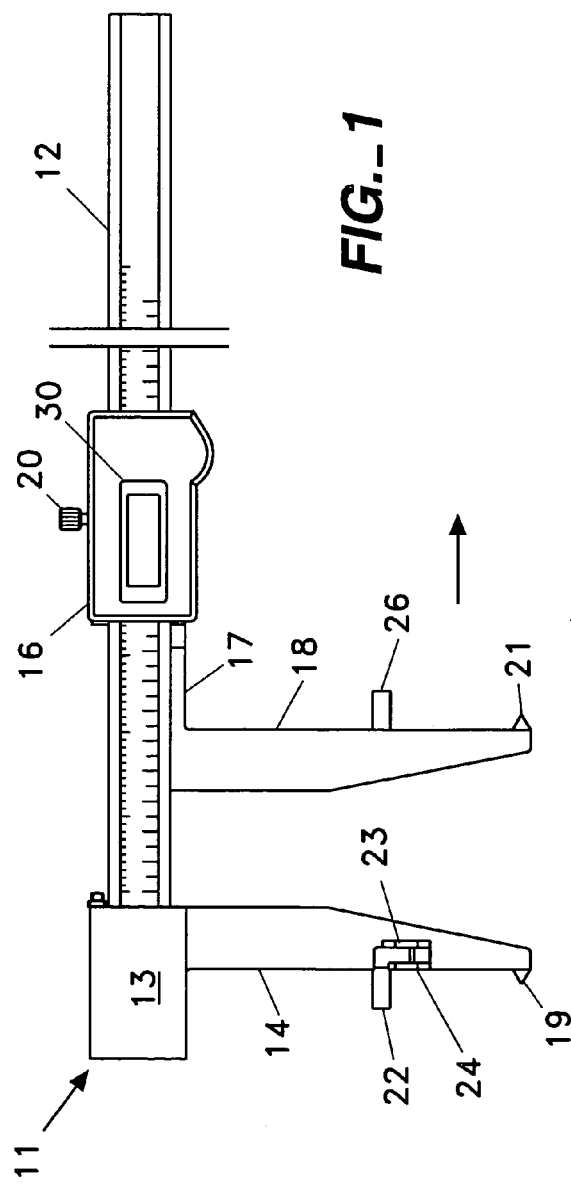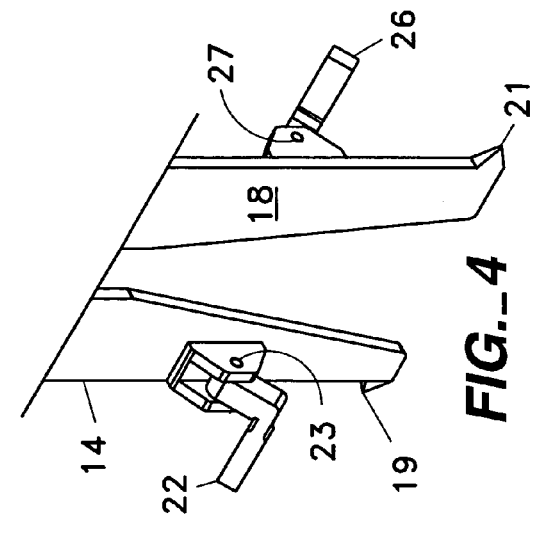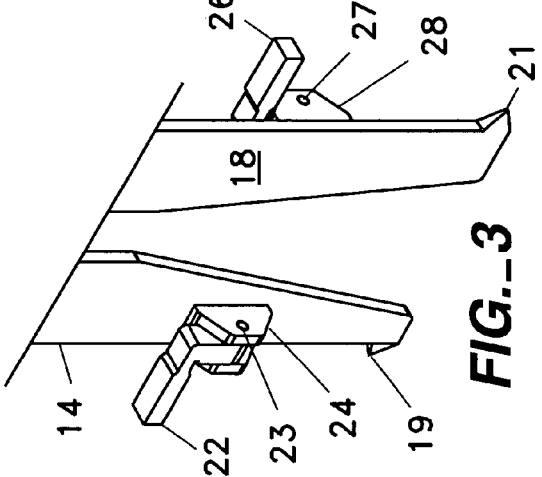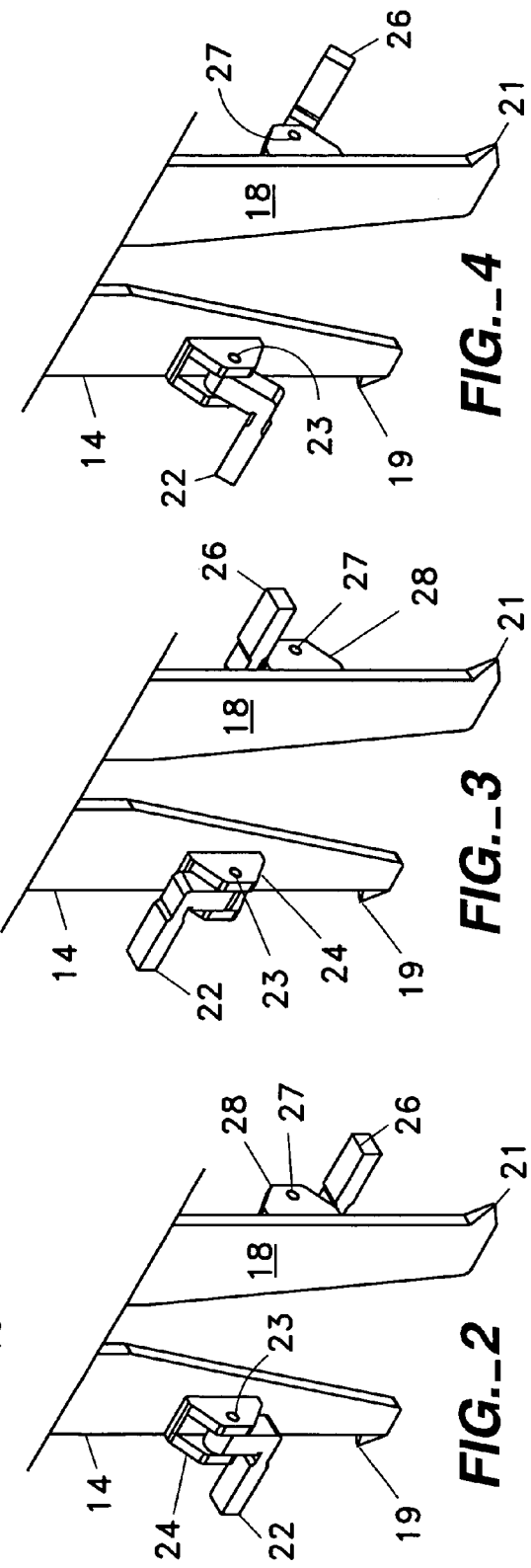

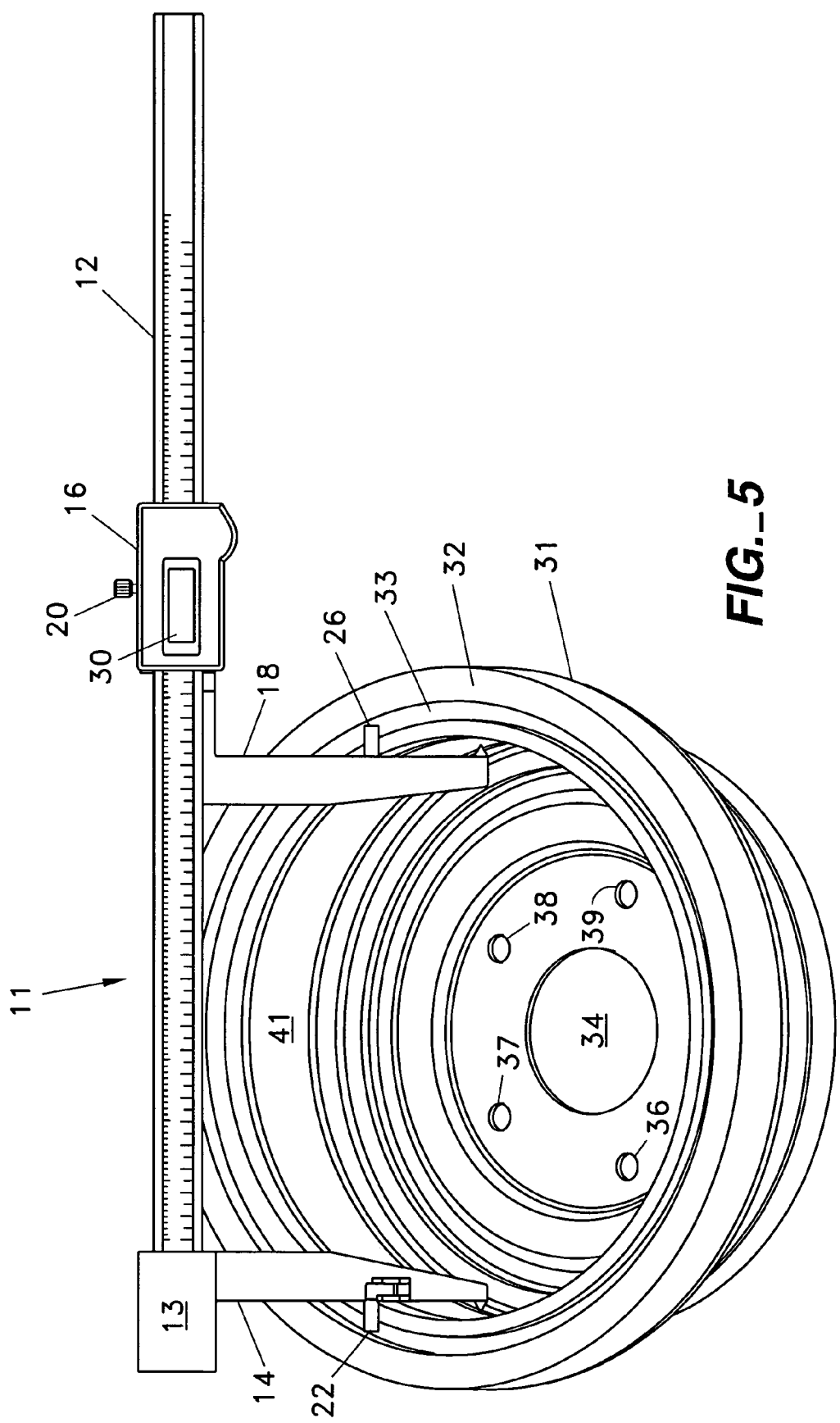
FIG._5

BRAKE DRUM CALIPER

BACKGROUND OF THE INVENTION

As cars are built today to last ten or fifteen years and be driven 100,000 to 200,000 miles, brakes usually need to be resurfaced at least once during the life of every car. Most owners do not become aware of the need for brake repair until the brakes make a sound indicating wear beyond the useful depth of braking surface. By this time, the brake drum, against which the movable shoe engages for braking action, becomes scored. Then, the drum must be machined to present a round, smooth surface for the new brake shoe surface to engage.

In order to machine the brake drum to present a round, smooth surface, calipers have been developed to accurately measure the inside diameter of the brake drum. It is essential to have a constant inside diameter in the refinished drum to engage the shoe surface evenly. U.S. Pat. No. 5,317,814 shows a drum caliper that can accurately measure diameter only if the points 44 and 74 of the caliper are at the same depth within the drum. If the beam is not precisely parallel to the drum, the measurement of diameter will be imprecise.

U.S. Pat. No. 5,465,501 was intended to correct the problem of having a skewed plane 38 (FIG. 3) giving an inaccurate reading. However, the slidable pins 26 and spring detents or other locking mechanisms described in the patent become fouled in an environment where metal shavings are ubiquitous. If a pin inadvertently slides inwardly within the drum, instead of resting on the periphery of the drum, a skewed angle can result with imprecise measurements. There is a need for fixed stops for precise depth locations, rather than slidable stops that can slip off the periphery of the drum.

SUMMARY OF THE INVENTION

The present invention substitutes a precise measurement of diameter of a brake drum by locating the caliper at precisely the same depth below the surface for each measurement. Two measurements at different depths assure a constant smooth diameter for the machined drum.

BRIEF DESCRIPTION OF THE DRAWINGS

FIG. 1 is a front view of the caliper in a partially opened position.

FIG. 2 is an isometric view of the jaws with stops in the lower position.

FIG. 3 is an isometric view of the jaws with stops in the upper position.

FIG. 4 is an isometric view of the jaws with stops in an intermediate position

FIG. 5 is an isometric view of the caliper in a drum with the stops in the upper position of FIG. 3.

DESCRIPTION OF THE PREFERRED EMBODIMENT

FIG. 1 shows a caliper 11 comprising a beam 12, preferably of hardened stainless steel with inches and millimeters scribed on the beam to indicate distance. Beam 12 has at the zero end a base plate 13 from which fixed jaw 14 extends. A commercially available movable counter 16 slides on the beam 12 to provide an accurate reading of diameter inside a brake drum to two decimal places in millimeters or three decimal places in inches. Rotatable set pin 20 holds counter 16 in place once the diameter is determined, and LED window 30 displays the diameter in either inches or millimeters. The electronic readout counter 16 is secured to movable base plate 17, which also carries movable jaw 18. Fixed jaw 14 has a fixed point 19 to engage one side of the drum for measuring diameter. Movable jaw 18 has a corresponding point 21 to engage the opposite side of the drum at its widest diameter.

Fixed jaw 14 has a stop 22 that precisely locates the point 19 at a predetermined depth within the drum by resting on the annular surface of the drum. Stop 22 is movable in a vertical plane through 180 degrees of movement by rotating around pin 23 held in holder 24 secured to jaw 14. Stop 22 is an L-shaped arm that can proceed from an upper position shown in FIG. 1 to a lower position shown in FIG. 2 and any intermediate position indicated in FIG. 4.

Movable jaw 18 also has a stop 26 at exactly the same distance from point 21 as the stop 22 is from the point 19 in fixed jaw 14, so long as each of stops 22 and 26 are in the same point along the 180 degree rotation. Pin 26 has a holder and pivot pin (not shown) as in holder 24 and pivot pin 23 of jaw 14.

FIG. 2 is a partial isometric view of the fixed jaw 14 and the movable jaw 18 with their respective stops 22 and 26 in the lowermost position relative to points 19 and 21. Stop 26 has a pivot pin 27 and holder 28 that were not visible in FIG. 1. By having stop 22 on one side of fixed jaw 14 and stop 26 on the opposite side of movable jaw 18 permits the caliper 11 to measure the maximum diameter of the drum without regard to the thickness of jaws 14 and 18.

FIG. 3 is a partial isometric view of the jaws of FIG. 2, but with the stops 22 and 26 in the uppermost position as in FIG. 1. Points 19 and 21 on jaws 14 and 18, respectively, engage the inside of the drum (not shown) at the widest diameter. Stops 22 and 26 rest on the annular ring of the drum to precisely locate points 19 and 21 at the same depth within the drum.

FIG. 4 is a partial isometric view of jaws 14 and 18 with stops 22 and 26 at the same intermediate point in the 180 degree range of movement of the pins about pivot pins 23 and 27, respectively. In operation, the caliper 11 is set in the lowermost position of FIG. 2 so that pins 19 and 21 are set to determine the maximum diameter at that depth. Then, the stops 22 and 26 are moved towards the positions in FIG. 4 as the caliper 11 is raised from the lowermost depth. Finally, a check of diameter at the uppermost position shown in FIG. 3 is made. If the diameter is unchanged, the drum surface is smooth and round. No slidable pins have to be manipulated at the various positions of depth, as in the prior art.

FIG. 5 illustrates the combination of a drum 31 with an upper surface 32 and an inner annular ring 33 on which stops 22 and 26 may rest as they pass from lowermost position to uppermost position (shown) in the 180 degree trajectory. Drum 31 has an opening 34 for mounting the drum on a wheel bearing (not shown) and holes 36, 37, 38 and 39 for allowing the wheel to be bolted to the car. Surface 41 is the one whose diameter is being measured for uniform diameter and smoothness, as it is the surface that brake shoes bear upon for slowing the vehicle.

The width of the brake shoe surface and corresponding drum surface is usually between 5 cm and 15 cm. I have found that the two maximum distances between the two limits for stops 22 and 26 may be between 20 mm and 40 mm apart. For most applications, if the closest limit for stops 22 and 26 to the measurement points 19 and 21 is between 20 mm and 40 mm, then the furthest limits for stops 22 and 26 may be between 20 mm and 40 mm from the first limit point.

The preferred embodiment is intended to be merely illustrative of how the invention may be used by one skilled in the art. It is intended to enable one skilled in the art to make and use the invention without limiting it to the specific features shown. Also. the caliper may be adapted for measuring roundness of any circular surface, and is not limited to brake drums.

What is claimed is:

1. In a caliper having two jaws appended from a beam mounted transversely in relation to a cylinder capable of indicating distance between the jaws in the diameter of the cylinder within the cylinder, characterized in that a stop pivotally mounted on each jaw is movable longitudinally between at least two limits to permit the jaws to measure distance at measuring points corresponding to the at least two limit positions perpendicular to and equidistant from the beam.

2. A caliper as in claim 1 wherein the caliper measures the inside diameter of a generally cylindrical surface along at least two points precisely the same distance from the end of the cylindrical surface.

3. A caliper as in claim 1 wherein the movable stops limit the measuring points to from 20 mm to 40 mm apart.

4. A caliper as in claim 1 wherein the distance from the stop closest to the measuring point is at least 20 mm.

5. A device for measuring the inside diameter of a brake drum comprising a fixed jaw with a point for measuring the maximum diameter at a point at one location along the friction surface of the drum and a movable jaw with a point for measuring the maximum diameter at the same distance from the edge of the friction surface, and stops pivotally mounted and movable longitudinally along the friction surface to keep the two opposed points the same distance along the friction surface of the drum.

* * * * *